Patented Aug. 22, 1944

2,356,586

UNITED STATES PATENT OFFICE 2,356,586

THIO-DIGLYCOL ESTER PLASTICIZED POLYVINYL CHLORIDE

Winfrid Hentrich and Rudolf Endres, Dessau-Rosslau, Germany; vested in the Alien Property Custodian No Drawing. Application June 14, 1941, Serial No. 398,105. In Germany March 1, 1940

2 Claims. (Cl. 260—36)

This invention relates to compounds suitable for use as dissolving, softening, gelatinizing and swelling agents and to plastic materials made therefrom.

We have found that the carboxylic acid esters of polyvalent alcohols comprising at least one thio-ether group in the molecule are excellent dissolving, softening, gelatinizing and swelling agents for all kinds of polymerisation products which are obtained by polymerisation of compounds containing at least one group

As compounds comprising at least one group

there may be mentioned for instance vinyl-alcohol, vinyl-esters, such as vinyl-chloride, wherein the polyvinyl-chloride may be subsequently halogenated, vinyl-acetate, vinyl-chloracetate, vinyl-acetals, vinyl-alkyl ether, vinyl-thio-ether, vinyl-amines, vinyl-acetylene, divinyl-acetylene, vinyl-alkyl-ketones, acrylic acid, acrylic acid esters, methacrylic acid, methacrylic acid ester, vinyl-acetic acid, styrol, butadiene, isoprene, isobutylene and the like.

As dissolving, softening, gelatinizing and swelling agents for the polymerisation products of the aforementioned compounds according to our invention the carboxylic acid esters of polyvalent alcohols are used in so far as these alcohols comprise at least one thio-ether group in the molecule. Such polyvalent alcohols are for instance thio-diglycol of the formula S(CH₂.CH₂.OH)₂,γ,γ'-dioxy-propyl sulphite of the formula

S(CH₂.CH₂.CH₂OH)₂ bis - (β - oxypropyl) - sulphide of the formula S(CH₂.CHOH.CH₃)₂, β-oxyethyl-β'-oxypropyl sulphide of the formula

HO.CH₂.CH₂.S.CH₂.CH(OH).CH₃ ethylene-bis-β-oxyethyl sulphide of the formula

HO.CH₂.CH₂.S.CH₂.CH₂.S.CH₂.CH₂.OH tetraethylene-trisulphide glycol of the formula S(CH₂.CH₂.S.CH₂.CH₂.OH)₂ as well as compounds of the general formula S(CH₂.(CH₂)$_x$.CH₂OH)₂ or HO.CH₂.(CH₂)$_x$.CH₂.S.CH₂.CH₂.OH or HOCH₂.CH₂.S.(CH₂)$_x$.S.CH₂.CH₂OH wherein $x$ denotes a whole number between 1 and 10, and furthermore of the formula

S(CH₂.CHOH.CH₂OH)₂

For the esterification of the polyvalent alcohols having at least one thio-ether group in the molecule mainly aliphatic carboxylic acids having from 7 to 9 carbon atoms in the molecule and having a branched or unbranched chain come into question; these acids are obtained in the industry mainly as waste fatty acids.

Such carboxylic acids are obtained, for instance, in the oxidation of paraffines. They are further contained in the by-products of the Ficher-Tropsch synthesis, in the lower fractions of natural fatty acid mixtures, for instance in the cocos-oil fatty acid, in the palm-kernel fatty acid and the like. Finally they may be obtained by dehydration of the high boiling alcohol fractions from the methanol synthesis. The esters of the polyvalent alcohols with at least one thio-ether group in the molecule with such aliphatic carboxylic acids having from seven to nine carbon atoms in the molecule are of excellent value as regards their gelatinizing power and their electrical properties.

Furthermore, carboxylic acids, such as acetic acid, lactic acid, butyric acid, capronic acid, caprinic acid and the like are suitable for esterifying the polyvalent alcohols having at least one thio-ether group in the molecule. For such purpose are also found suitable undecyclenic acid, levulinic acid, butoxy-acetic acid, butoxy-ethoxy acetic acid, octyloxy-acetic acid, alkoxy-acetic acids in which the alkyl residue represents a hydrocarbon mixture having from seven to nine carbon atoms in the molecule, naphthenyloxy acetic acid, cresoxy acetic acid, phenyl acetic acid, benzoic acid, salicylic acid, benzoyl-benzoic acid. Of polybasic acids there may be mentioned succinic acid, adipinic acid, cyclohexane-diacetic acid and the like.

The production of the esters according to our invention is effected in the customary manner known as such and does not offer any technical difficulties.

The described softening agents and the like may easily be incorporated into the aforementioned products of polymerisation, especially into polyvinyl chloride which had not subsequently been chlorated. They are well compatible with other substances so that by simultaneously using these softening agents, from the products of polymerisation there may be made mixed products, for instance products mixed with cellulose derivatives, natural resins, natural caoutchouc, artificial albumene masses or other artificial resins. As compared with other esters which had so far been proposed for the same purposes the esters forming part of our present invention are advantageously distinguished by high gelatinizing power as well as by excellent electrical properties.

*Example 1*

25 parts by weight of polyvinyl chloride which had not been subsequently chlorated are kneaded together at about 160° with 75 parts by weight of a thio-diglycol fatty acid ester having an acid component representing a fatty acid mixture with from seven to nine carbon atoms in the molecule, kneading being continued for such a length of time until a homogeneous mass has been obtained. This mass is thereupon rolled out into thin films by means of a calender, said films being marked by high elasticity permitting them to be worked into elastic coverings, such as protecting garments, protecting covers and the like.

*Example 2*

75 parts by weight of polyvinyl chloride are mixed with 25 parts by weight of a mixture of the fatty acid esters from thio-diglycol and waste fatty acids having from seven to nine carbon atoms in the molecule and the mixture is rolled out in hot condition into a sheet. A cable is covered with this homogeneous mass in known manner, thereby producing a cable covering of high elasticity, high resistance of cold and very high insulating power.

Instead of the mixture of the fatty acid esters from thiodiglycol and waste fatty acids having from seven to nine carbon atoms in the molecule there may also be used the dicapryl-acid ester of the ethylene-bis-β-oxyethyl sulphide.

We claim:
1. Plastic material consisting of a polymerisation product of polyvinyl chloride and an ester of thio-diglycol with a mono-basic aliphatic carboxylic acid comprising from seven to nine carbon atoms in the molecule.
2. Plastic material consisting of a polymerisation product of polyvinyl chloride and a di-ester of thio-diglycol with a mono-basic aliphatic carboxylic acid comprising from seven to nine atoms in the molecule.

WINFRID HENTRICH.
RUDOLF ENDRES.